(12) United States Patent
Mishne et al.

(10) Patent No.: US 8,631,004 B2
(45) Date of Patent: Jan. 14, 2014

(54) SEARCH SUGGESTION CLUSTERING AND PRESENTATION

(75) Inventors: Gilad Mishne, Oakland, CA (US); Alpa Jain, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 388 days.

(21) Appl. No.: 12/648,220

(22) Filed: Dec. 28, 2009

(65) Prior Publication Data

US 2011/0161311 A1    Jun. 30, 2011

(51) Int. Cl.
G06F 17/00 (2006.01)
G06F 17/30 (2006.01)
G06F 3/048 (2013.01)

(52) U.S. Cl.
USPC ............ 707/727; 707/767; 707/768; 715/816

(58) Field of Classification Search
USPC ................. 707/727, 729, 766–768; 715/816
See application file for complete search history.

(56) References Cited

U.S. PATENT DOCUMENTS

| | | | |
|---|---|---|---|
| 6,424,971 B1 * | 7/2002 | Kreulen et al. | 707/737 |
| 7,428,529 B2 * | 9/2008 | Zeng et al. | 1/1 |
| 2004/0267600 A1 * | 12/2004 | Horvitz | 705/10 |
| 2005/0055341 A1 * | 3/2005 | Haahr et al. | 707/3 |
| 2005/0283468 A1 | 12/2005 | Kamvar et al. | |
| 2006/0106769 A1 | 5/2006 | Gibbs | |
| 2007/0162422 A1 * | 7/2007 | Djabarov | 707/2 |
| 2009/0043741 A1 | 2/2009 | Kim | |
| 2009/0150826 A1 * | 6/2009 | Lyndersay et al. | 715/810 |
| 2009/0171929 A1 * | 7/2009 | Jing et al. | 707/5 |
| 2009/0187515 A1 * | 7/2009 | Andrew et al. | 706/12 |
| 2009/0327270 A1 * | 12/2009 | Teevan et al. | 707/5 |
| 2010/0205202 A1 * | 8/2010 | Yang et al. | 707/767 |

OTHER PUBLICATIONS

D. Beeferman and A. Berger. Agglomerative clustering of a search engine query log. In *KDD*, 2000.
D. Bollegala, Y. Matsuo, and M. Ishizuka. Measuring semantic similarity between words using web search engines. In *WWW*, 2007.
A. Budanitsky and G. Hirst. Evaluating wordnet-based measures of lexical semantic relatedness. *Computational Linguistics*, 2006.
S. Chien and N. Immorlica. Semantic similarity between search engine queries using temporal correlation. In *WWW*, 2005.
K. Church and B. Thiesson. The wild thing! In *ACL*, 2005.
D. R. Cutting, D. R. Karger, J. O. Pedersen, and J. W. Tukey. Scatter/Gather: A cluster-based approach to browsing large document collections. In *SIGIR'92*, pp. 318-329, 1992.
S. Dumais, E. Cutrell, and H. Chen. Optimizing search by showing results in context. In *CHI*, 2001.
N. Glance. Community search assistant. In */UI*, 2001.

(Continued)

*Primary Examiner* — James E Richardson
(74) *Attorney, Agent, or Firm* — Weaver Austin Villeneuve & Sampson LLP

(57) ABSTRACT

Disclosed are methods and apparatus for clustering and presenting search suggestions. A segment of text is obtained via a search query section of a user interface, the segment of text being a portion of a search query. A set of suggestions is obtained, each suggestion in the set of suggestions being a suggested search query relating to the segment of text. Two or more groups of suggestions are generated, each of the two or more groups of suggestions including a different subset of the set of suggestions. The two or more groups of suggestions are provided such that each of the two or more groups of suggestions is displayed in a separate partition of a search assistance segment of the user interface.

27 Claims, 7 Drawing Sheets

(56) References Cited

OTHER PUBLICATIONS

R. Jones, B. Rey, 0. Madni, and W. Greiner. Generating query substitutions. In *WWW*, 2006.

G. Li, S. Ji, C. Li, and J. Feng. Efficient type-ahead search on relational data: a tastier approach. In *SIGMOD*, 2009.

D. Lin. Automatic retrieval and clustering of similar words. In *ACL*, 1998.

Q. Mei, D. Zhou, and K. Church. Query suggestion using hitting time. In *CIKM*, 2008.

P. Pantel and D. Ravichandran. Automatically labeling semantic classes. In *HLT-NAACL*, 2004.

M. Sahami and T. Heilman. A Web-based kernel function for measuring the similarity of short text snippets. In *WWW*, 2006.

P. Treeratpituk and J. Callan. Automatically labeling hierarchical clusters. In *DG 06*, 2006.

P. D. Turney. Mining the web for synonyms: Pmi-ir versus lsa on toefl. In *ECML*, 2001.

J.-R. Wen, J.-Y. Nie, and H.-J. Zhang. Query clustering using user logs. *ACM Transactions on Information Systems*, 2002.

W.-T. Yih and C. Meek. Improving similarity measures for short segments of text. In *IAAI*, 2007.

Z. Zhang and 0. Nasraoui. Mining search engine query logs for query recommendation. In *WWW*, 2006.

You Tube Adds Query Suggestions for Search. Search Marketing News Blog, http://blog.searchenginewatch.com/080519-101916, printed Dec. 23, 2009.

B. Slawski, Predictive Search Query Suggestions, May 8, 2009, http://www.seobythesea.com/!p+1375, printed Dec. 23, 2009.

PCT International Search Report and Written Opinion dated Aug. 25, 2011 from PCT Application No. PCT/US2010/061120.

Carmel, et al. "Enhancing Cluster Labeling Using Wikepedia"; Sigir 2009.

Chung, et al. "Thematic mapping—from unstructured documents to taxonomies"; CIKM 2002.

\* cited by examiner

| salsa |
|---|
| salsa recipes
salsa dancing
salsa dance
salsa music
salsa singer cruz
homemade salsa
salsa lessons
salsa classes |

FIG. 4

SEARCH SUGGESTION CLUSTERING AND PRESENTATION

BACKGROUND OF THE INVENTION

The present invention relates generally to computer implemented searching and presentation of suggested search queries.

Users of the World Wide Web are familiar with the various services available on the Web for locating content of interest. Search engines are provided by a number of entities and search capabilities are embedded in many web sites. For instance, many web sites provide search applications that enable users to search the content of the web sites, as well as web sites across the Internet.

Search engines often offer a search suggestion tool that helps users complete their query faster by predicting the next characters and words they will type. For example, as a user starts typing "sacr . . . ," a drop-down window typically appears under the search box offering common completions and relevant suggestions such as "sacramento," "sacramento airport," and "sacred heart." The user can then simply select from the list instead of typing in the complete search query.

SUMMARY OF THE INVENTION

Methods and apparatus for clustering and presenting suggested search queries (i.e., search suggestions) are disclosed. In accordance with one embodiment, a segment of text is obtained via a search query section of a user interface, the segment of text being a portion of a search query. A set of suggestions is obtained, each suggestion in the set of suggestions being a suggested search query relating to or including the segment of text. Two or more groups of suggestions are generated, each of the two or more groups of suggestions including a different subset of the set of suggestions. The two or more groups of suggestions are provided such that each of the two or more groups of suggestions is displayed in a separate partition of a search assistance segment of the user interface.

In accordance with one aspect, a label or image is provided in association with each of the two or more groups of suggestions such that the label or image is displayed in the user interface in close proximity to the corresponding one of the two or more groups of suggestions. The label or image may be obtained using information from within the corresponding group of suggestions. Alternatively, the label or image may be obtained using information external to the corresponding group of suggestions, in addition to or instead of the information obtained from within the corresponding group of suggestions.

In accordance with yet another aspect, a set of suggestions may be clustered if it is determined that the search query is ambiguous based upon the portion of the search query that has been submitted. For instance, the search query may be ambiguous if an initial clustering of the set of suggestions yields groups of suggestions that substantially differ in their size.

In another embodiment, the invention pertains to a device comprising a processor, memory, and a display. The processor and memory are configured to perform one or more of the above described method operations. In another embodiment, the invention pertains to a computer readable storage medium having computer program instructions stored thereon that are arranged to perform one or more of the above described method operations.

These and other features and advantages of the present invention will be presented in more detail in the following specification of the invention and the accompanying figures which illustrate by way of example the principles of the invention.

BRIEF DESCRIPTION OF THE DRAWINGS

FIG. 4 is a diagram illustrating example suggestions that may be provided to a user when a user types "salsa" into a search query section of a user interface.

DETAILED DESCRIPTION OF THE SPECIFIC EMBODIMENTS

Figure 1:
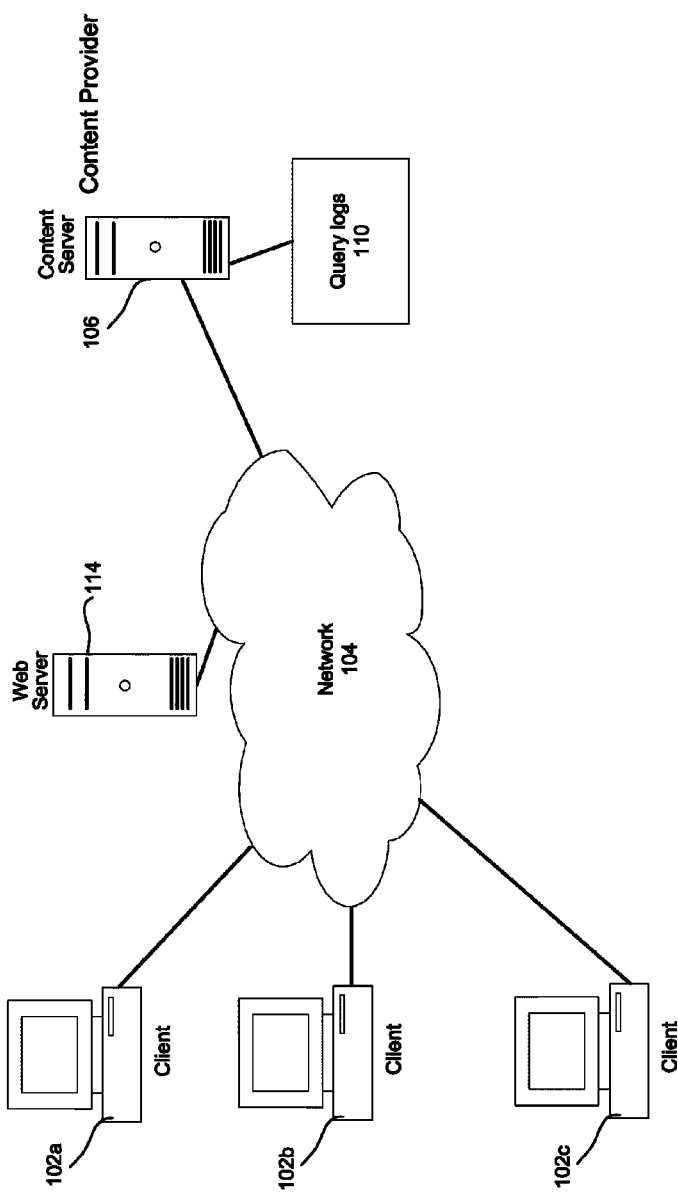
FIG. 1 is a block diagram illustrating an example system in which various embodiments may be implemented.

Reference will now be made in detail to specific embodiments of the invention. Examples of these embodiments are illustrated in the accompanying drawings. While the invention will be described in conjunction with these specific embodiments, it will be understood that it is not intended to limit the invention to these embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

The disclosed embodiments provide a user interface for providing search suggestions in response to receiving a portion of a search query. More particularly, each search suggestion may be a suggested search query that relates to or includes (e.g., completes or corrects) the portion of the search query. Thus, the term "suggestion," "search suggestion," "suggested search query," "query completion," "suggested search query completion," and "query completion suggestion" may be used interchangeably.

Search suggestions provided to the user may be organized into two or more groups, which may be referred to as clusters or partitions. Clustering search suggestions may be particularly useful for ambiguous queries that have more than one possible interpretation. More particularly, search queries may be organized according to different interpretations of the portion of the search query that has already been entered.

As the user types (e.g., adds, modifies, and/or deletes one or more characters), the search suggestions that are provided will change. Similarly, the clustering of the search suggestions will also be performed dynamically as the user types the search query. Therefore, the number of groups of suggestions, the number of suggestions in each group of suggestions, and the manner in which the suggestions are grouped will also change dynamically as the user types the portion of the query. Stated another way, a user modification, addition, and/or deletion of at least a portion of the search query will trigger the clustering of the suggestions, as will be described in further detail below.

In recent years, the Internet has been a main source of information for millions of users. These users rely on the Internet to search for information of interest to them. One conventional way for users to search for information is to initiate a search query through a search service's web page. Typically, a user can enter a query including one or more search term(s) into an input box on the search web page and then initiate a search based on such entered search term(s). In response to the query, a web search engine generally returns an ordered list of search result documents.

A document may be defined as a Uniform Resource Locator (URL) that identifies a location at which the document can be located. The document may be located on a particular web site, as well as a specific web page on the web site. For instance, a first URL may identify a location of a web page at which a document is located, while a second URL may identify a location of a web site at which the document can be located.

FIG. 1 illustrates an example network segment in which various embodiments of the invention may be implemented. As shown, a plurality of clients 102a, 102b, 102c may access a search application, for example, on search server 106 via network 104 and/or access a web service, for example, on web server 114 via a graphical user interface, as will be described in further detail below. The network may take any suitable form, such as a wide area network or Internet and/or one or more local area networks (LAN's). The network 104 may include any suitable number and type of devices, e.g., routers and switches, for forwarding search or web object requests from each client to the search or web application and search or web results back to the requesting clients.

The invention may also be practiced in a wide variety of network environments (represented by network 104) including, for example, TCP/IP-based networks, telecommunications networks, wireless networks, etc. In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

A search application generally allows a user (human or automated entity) to search for information that is accessible via network 104 and related to a search query including one or more search terms. The search terms may be entered by a user in any manner. For example, a graphical user interface such as that described in further detail below may present an input feature to the client (e.g., on the client's device) so the client can enter a query including one or more search term(s). In a specific implementation, the graphical user interface presents an input box (i.e., search query section) into which a user may type a query including any number of search terms or portion thereof. Specifically, a graphical user interface may provide a search query section for receiving at least a portion of a search query, as well as another portion in which suggested search queries (i.e., search suggestions) associated with the search query may be provided. The user may then select one of the suggested search queries to submit to a search engine via the graphical user interface.

The search query may then be executed via one or more search applications (e.g., associated with search server 106 and/or web server 114) and/or one or more data sources. Embodiments of the present invention may be employed with respect to any search application. The search application may be implemented on any number of servers although only a single search server 106 is illustrated for clarity.

The search server 106 (or servers) may have access to one or more query logs 110 into which search information is retained. For example, the query logs 110 may be retained in one or more memories that are coupled to the search server 106. Each time a user performs a search on one or more search terms, information regarding such search may be retained in the query logs 110. For instance, the user's search request may contain any number of parameters, such as user or browser identity and the search terms, which may be retained in the query logs 110. Additional information related to the search, such as a timestamp, may also be retained in the query logs 110 along with the search request parameters. When results are presented to the user based on the entered search terms, parameters from such search results may also be retained in the query logs 110. For example, the specific search results, such as the web sites, the order in which the search results are presented, whether each search result is a sponsored or algorithmic search result, the owner (e.g., web site) of each search result, whether each search result is selected (i.e., clicked on) by the user (if any), and/or a timestamp may also be retained in the query logs 110.

Upon receiving a search query, the search server 106 may identify and present the appropriate web pages that are pertinent to the query. For instance, the search server 106 may identify and present a plurality of hypertext links that identify content that is pertinent to the search query, as well as present a summary or abstract associated with the plurality of hypertext links.

Embodiments disclosed herein may be implemented via the search server (or other server) 106 and/or the clients 102a, 102b, 102c. For example, various features may be implemented via a web browser and/or application on the clients 102a, 102b, and 102c. The disclosed embodiments may be implemented via software and/or hardware.

Search engines are increasingly exploring ways to reduce user efforts in performing search-related tasks. Such efforts have resulted in the widely used auto-completion mechanism that automatically suggests possible completions of search queries while users are formulating their queries. However, the conventional auto-complete mechanism can provide search suggestions that are confusing to the user, particularly when the set of completions consists of different interpretations of the query that are displayed in an interleaved manner.

Figure 2A:
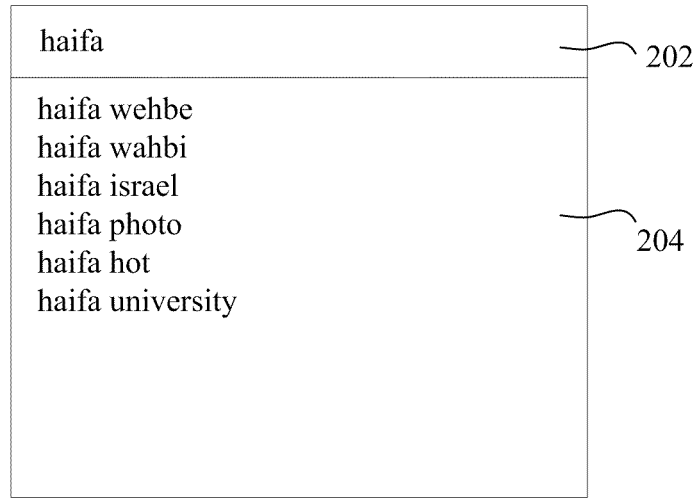
FIG. 2A is a diagram illustrating an example graphical user interface via which a list of search query suggestions is presented.

FIG. 2A is a diagram illustrating an example graphical user interface illustrating suggested search queries provided via a conventional auto-completion mechanism. Consider the case where a user initiates a search engine query by typing the character sequence, haifa, into a search query section 202 of a graphical user interface associated with a search engine. As the user types in the search query section 202 of the graphical user interface, the user's input may be treated as a portion of a search query. The portion of the search query may include one or more characters, as well as one or more words or portion thereof. In this example, the portion of the search query is treated as a search query prefix. For this search query prefix, the set of suggestions presented by a major search engine could include the ordered list, as shown at 204.

Various factors such as click behavior, query frequencies, or query reformulations, based on past user behavior may determine the set of suggested search query completions (i.e., search suggestions) offered by a search engine. The disclosed embodiments may extend the current query completion approach by organizing suggestions for auto-complete by topic.

As illustrated in FIG. 2A, the query completion suggestions may correspond to non-identical real-world entities, facets, or topics. For instance, suggestions at positions 1, 2, and 5 correspond to a popular entertainer, whereas suggestions at positions 3 and 6 correspond to a city. Moreover, query suggestions associated with similar or the same facets or topics may not be grouped together, and therefore suggestions may often be presented as an unordered list from a topical perspective.

As shown in FIG. 2A, when a search query (or portion thereof) has different possible meanings, the suggestions may relate to different interpretations of the portion of the search query that has already been provided. Moreover, these suggestions are typically sorted only by popularity, resulting in the suggestions corresponding to the different interpretations being provided in an interleaved fashion. The disclosed embodiments enable suggested search queries to be grouped, allowing the user to easily identify the group of search queries containing the most relevant search suggestions.

Figure 2B:
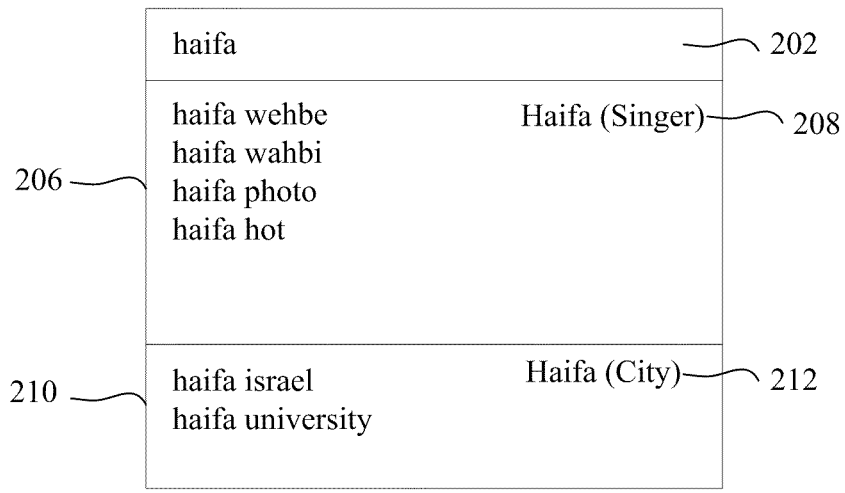
FIGS. 2B-C are graphical user interfaces illustrating example groups of suggestions after clustering of a list of suggestions has been performed.
Figure 2C:
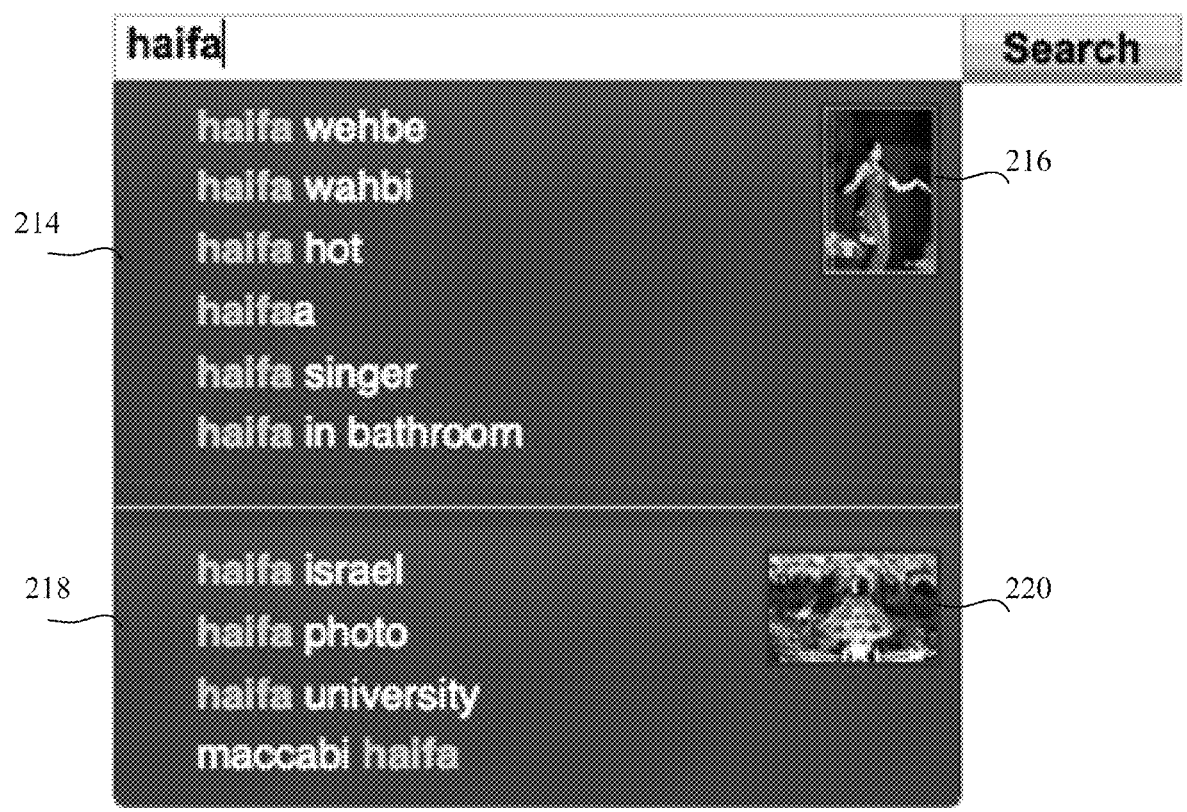

FIGS. 2B-C are screen shots illustrating example graphical user interfaces that may be presented in accordance with various embodiments. As shown in FIGS. 2B-C, the disclosed embodiments may enable a set of suggested queries to be clustered and presented via a graphical user interface. Moreover, each cluster may be identified by a label or image within the graphical user interface, as shown in FIGS. 2B and 2C, respectively.

As shown in FIGS. 2B and 2C, when a user enters search query portion "Haifa" into a search query section 202 of a graphical user interface, a set of suggestions including the search query portion may be obtained (e.g., via one or more search query logs). The set of suggestions may be clustered into two or more groups of suggestions using one or more clustering methods according to real-world entity, facet, topic or other criteria. For instance, each group of suggestions may be presented in a separate partition or segment of the graphical user interface.

Moreover, a suitable label or image identifying each group of suggestions may be ascertained and provided in association with the group of suggestions in order to assist the user in distinguishing between the corresponding groups of suggestions. As shown in FIGS. 2B-C, a label or image may be displayed in association with each of the two or more groups of suggestions such that the label or image is provided in association with the corresponding group. For instance, the label or image may be displayed in the user interface in close proximity to the corresponding one of the two or more groups of suggestions.

As shown in FIG. 2B, a different label may be displayed in association with each group of suggestions or corresponding partition of the graphical user interface. For example, a first group of suggestions displayed in partition 206 may be assigned a label, "Haifa (Singer)" displayed at 208, while a second group of suggestions displayed in partition 210 may be assigned a label, "Haifa (City)" displayed at 212.

Similarly, as shown in FIG. 2C, a different image may be displayed in association with each group of suggestions or partition of the graphical user interface. For example, a first group of suggestions displayed in partition 214 may be identified by an image displayed at 216, while a second group of suggestions displayed in partition 218 may be identified by an image displayed at 220.

When a user selects one of the suggestions in one of the groups of suggestions, search results associated with the selected suggestion may be obtained and provided. In this manner, the disclosed embodiments may facilitate the user search process.

Figure 3:
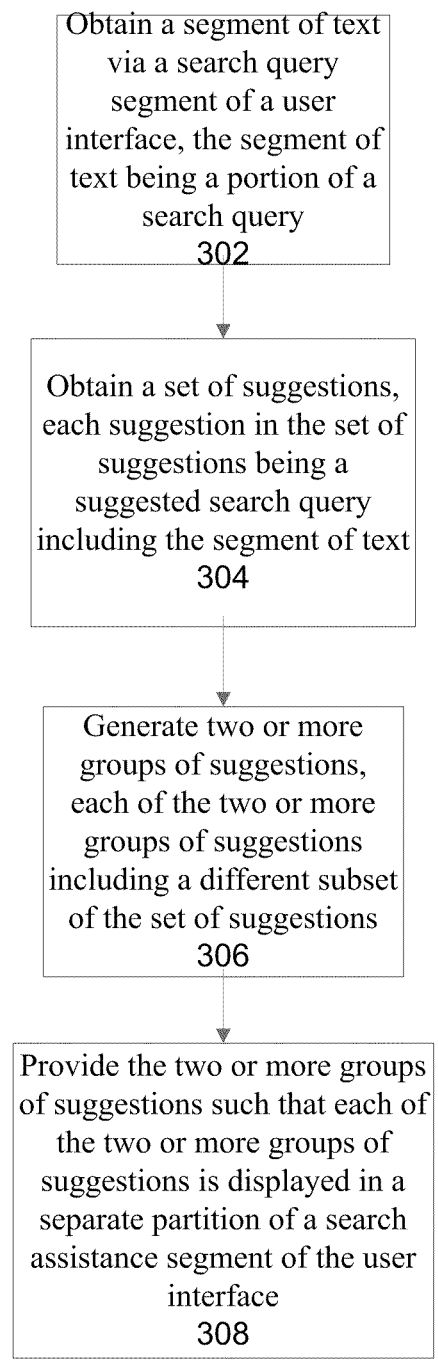
FIG. 3 is a process flow diagram illustrating an example method of clustering and presenting a set of suggestions in accordance with various embodiments of the invention.

FIG. 3 is a process flow diagram illustrating an example method of performing search suggestion clustering in accordance with various embodiments. A segment of text may be obtained at 302 via a search query section of a user interface, where the segment of text is a portion of a search query. More particularly, the portion of the search query may be a first portion of the search query, which may be referred to as a "prefix" of the search query or "query prefix." For instance, the query prefix may be a sequence of characters typed by a user while formulating a search query. Alternatively, the portion of the search query may be in the middle or at the end of the intended search query, which may be referred to as an "infix" or "suffix," respectively.

A set of suggestions may be obtained at 304, where each suggestion in the set of suggestions is a suggested search query including the segment of text. The set of suggestions may be obtained by searching a database of search queries for queries that include the user-entered text (e.g., query prefix). The database of search queries may be associated with the user, or may be a global database that stores data for a plurality of users. Generally, suggestions are ordered according to popularity of the corresponding search query.

In one embodiment, it may be determined from the set of suggestions whether the search query is an ambiguous query. A search query may be determined to be ambiguous if there is more than one possible interpretation of the previously entered portion of the search query. For example, the query may be determined to be ambiguous based upon the number of suggestions in each group of suggestions upon initial clustering of the set of suggestions. More specifically, if the suggestions fall within two or more groups, then the query may be determined to be ambiguous. However, if very few suggestions exist in one group in comparison to another group, this may indicate that the query is not ambiguous. If the search query is an ambiguous query, the set of suggestions may be clustered, as described below with reference to blocks 306 and 308.

Two or more groups of suggestions may be generated at 306, where each of the two or more groups of suggestions includes a different subset of the set of suggestions. More particularly, a set of one or more features associated with each suggestion in the set of suggestions may be obtained. The set of one or more features associated with each suggestion in the set of suggestions may then be applied to generate the two or more groups of suggestions. The features may be obtained from the suggestion and/or at least a portion of search results obtained when a search query is executed using the suggestion. For instance, the features for a particular suggestion may include a set of one or more words in the suggestion and/or a set of one or more words in the search results. Words in search results for a particular suggestion may include words found in a title, abstract, and/or Uniform Resource Locator (URL) of one or more documents. The features for a particular suggestion may also include clickthrough data associated with the suggestion. Various mechanisms for obtaining and applying various features will be described in further detail below.

Upon generating the groups of suggestions, it may be desirable to re-group the group of suggestions. For example, re-grouping may be desirable if the number of suggestions in a particular group of suggestions is substantially less than the number of suggestions in another group of suggestions.

It may be desirable to determine whether to present the two or more groups of suggestions. For instance, it may be determined that the query is not ambiguous. If the query is determined to be unambiguous, the two or more groups of suggestions may not be provided (e.g., displayed).

Where the query is ambiguous, the two or more groups of suggestions may be provided at 308 such that each of the two or more groups of suggestions is displayed in a separate partition of a search assistance segment of the user interface. For instance, the partitions may be presented sequentially within the search assistance segment of the user interface. A variety of methods for ordering the groups of suggestions within the search assistance segment will be described in further detail below.

The suggestions within a particular group of suggestions may also be ordered according to various methods. For instance, the suggestions within a particular group of suggestions may be displayed in order of popularity of the execution or selection of the suggestions as a search queries. The popularity of a particular suggestion as a search query may be ascertained using query log data for the user entering the current search query. Alternatively, the popularity of a particular suggestion as a search query may be ascertained using query log data for a plurality of users.

Moreover, a label or image identifying each of the two or more groups of suggestions may be provided such that the label or image is displayed in association with the corresponding group of suggestions. For instance, the label or image may be displayed in association with the corresponding partition of the search assistance segment. More particularly, the label or image associated with each of the two or more groups of suggestions may be provided in the corresponding segment of the search assistance segment of the user interface. Various methods for identifying or generating a label or image to be presented for a particular group of suggestions will be described in further detail below.

1. Clustering Suggestions

The generation of two or more groups of suggestions such that the set of suggestions is divided among the groups of suggestions may be defined as a mathematical problem.

PROBLEM: Given a portion of a query (e.g., prefix p) and a set of suggestions (e.g., ordered set of suggestions), $S=\{s1, s2, \ldots, sn\}$, we can partition S into k disjoint partitions (e.g., ordered partitions), $P=\{P1, P2, \ldots, Pk\}$, such that every si belongs to exactly one Pj, and the members of every Pj are topically-coherent (i.e., refer to a single topic or aspect of query q). After partitioning S, we can assign a distinct label L (and/or image I) to each partition such that L(Pj) or I(Pj) indicates or describes to a user that topic or aspect which is shared by members of the partition P(j), but not by the rest of the elements in S. More specifically, we can identify a topic or aspect that is shared by members of a partition P(j) and then obtain a label or image that represents the identified topic or aspect. We can also rank the partitions P(j) and/or the suggestions within each of the partitions P(j) so as to maximize the utility of the set S to the user.

A variety of clustering mechanisms may be applied to partition a set of suggestions into two or more groups of suggestions based upon a portion of a query (e.g., query prefix). Three different clustering mechanisms will be described below. In the following description, it is assumed that the portion of the query that is shared by the suggestions in the set of suggestions is a query prefix. However, it is important to note that the portion of the query that is shared may occur in different places in the query.

A clustering task can be reduced to the task of finding the similarity (or distance) between any two of the elements (e.g., suggestions) being clustered. The three example clustering mechanisms described below provide different methods of estimating the similarity between two suggestions in a set of suggestions provided for a portion of a query.

1.1 Head Word Clustering

Many of the suggestions offered as the user types a search query are completions, treating the user input as a prefix. Sometimes, the user input is treated as a suffix or infix. As a result, the set S may already be very similar at the lexical level. In general, a suggestion si can be viewed as $si=p \cup ci$, where p is the user-supplied query prefix and ci is additional context (e.g., one or more characters) added in the particular suggestion si. Where the portion of the query that has been entered by the user is a query prefix, the additional context ci may be one or more characters occurring subsequent to the query prefix. Alternatively, the additional context ci may include one or more characters occurring prior to the portion of the query and/or one or more characters occurring after the portion of the query. The character(s) prior to and/or after the portion of the query that has been entered may include one or more words or portions thereof.

FIG. 4 is a diagram illustrating example suggestions that may be provided to a user when a user types "salsa" into a search query section of a user interface. As shown in this example, the suggestions already share a prefix p. The terms that may be useful for identifying the cluster that the suggestion si belongs to are most likely in the additional context ci of that suggestion si.

In one embodiment, we can select a single term from each suggestion si, where the single term is the most representative term, that is, the term most distinguishing the suggestion si from the rest of the suggestions. Clustering may then be performed on S using these terms. In the example shown in FIG. 4, the discriminative terms are "recipes," "dancing," "dance,", "music," "singer," "homemade," "lessons," and "classes." Each of these terms may be referred to as a "head word" of the corresponding suggestion si.

Each suggestion si in the set of suggestions S may be parsed to obtain a set of one or more words. A "head word" (e.g., representative word) in the set of one or more words may then be identified for each suggestion si. Thus, the set of features associated with each suggestion si in the set of suggestions may include the head word for the suggestion.

A variety of approaches for estimating semantic or topical word-level similarity may be applied to ascertain the similarity between head words of suggestions, and therefore ascertain the similarity between the suggestions si. Commonly-used methods include those based on word contexts in a large corpus or lexical resources such as Wordnet. For example, Pointwise Mutual Information (PMI) using Information Retrieval (IR), PMI-IR, is a simple co-occurrence technique that may be used to ascertain the similarity between two words $\{wi, wj\}$. The similarity between two words $\{wi, wj\}$ may be defined as the pointwise mutual information between the words, where the probability of a single word, $P(wi)$, as well as the joint probability $P(wi, wj)$ are estimated using maximum likelihood of occurrences in a corpus. Specifically, the similarity measure between the words in this case may be defined as $$Sim(wi, wj) = \log \frac{\frac{|counts(wi) \cap counts(wj)|}{n}}{\frac{|counts(wi)|}{n} \cdot \frac{|counts(wj)|}{n}}$$

where counts (x) is the set of documents containing x and n is the corpus size (e.g., number of search results). The similarity between two suggestions may be the similarity between the head words.

Head Word Selection

Due to the short average length of web queries, the additional context ci often includes a single term. Thus, this single term may be used as the head word for the suggestion si. However, there are cases where the additional context ci includes two or more words. Thus, the head word may be chosen from these words using various approaches for selecting a head word for a particular suggestion si. Several example approaches are described below.

First Word:
Select the leftmost word in the additional context ci. For instance, where a suggestion is "salsa singer cruz," the additional context ci is "singer cruz," and the first word is "singer."

Last Word:
Select the rightmost word in the additional context ci (e.g., cruz in the suggestion "salsa singer cruz").

Frequency:
Compute, for each word in the additional context ci the product of the term-frequency (tf) value and the inverse-document-frequency (idf) value, ti·idf, where a "document" that may be used to compute tf may include all words in the suggestion set S being clustered, and idf is computed over the set S of all suggestions for the user input:

$$tf(w) = \frac{\sum_{s \in S} count_w(s)}{\sum_{s \in S} |s|}$$

$$idf(w) = \log \frac{|S|}{|\{s \mid w \in s\}|}$$

The head word for a particular suggestion si may be selected by selecting the word with the highest tf·idf value.

1.2 Result-Set Clustering

In order to ascertain the similarity between two query suggestions, the search results associated with each of the query suggestions may be leveraged. Each of the suggestion queries may be represented using the corresponding tf idf values for terms found in the top N ranked search results (e.g., documents) for the corresponding query suggestion. Thus, the set of features associated with each suggestion in the set of suggestions may include or be based upon a set of words in the corresponding set of search results.

Given a query suggestion si, we can obtain a set of search results R(si) of the top N documents for the suggestion si returned by a search engine. Each document d∈R(si) may include a title, an abstract, and a uniform research locator (URL). An abstract may be a portion of the document d that is shown to the user, containing the terms in the query and a small amount of context around the terms. Thus, the tf idf values may be ascertained for one or more words in the title t(d), abstract a(d), and/or URL u(d) of each of the top N search results.

In one embodiment, each document component (title, abstract, and/or URL) may be represented by a tf·idf vector of the terms appearing in it, that is, a vector where each position stores the tf·idf value of one word. The vectors of the document components may be ascertained for each of the top N documents. The document component vectors for the result set R(s) may be obtained by obtaining a centroid (e.g., average vector) of each of the component vectors over all of the documents for a particular suggestion si. For instance, a vector title(si) for the result set R(si) may be obtained by obtaining a centroid of the vectors title(d) for the top N titles of the documents defining the result set R(si). A single vector, vs, for a particular suggestion si may be obtained by concatenating the vectors title(d), abstract(d), and/or url(d) corresponding to the result set R(si) for that suggestion si. This process may be performed for each suggestion si. A similarity function such as a cosine similarity function may be applied to ascertain the similarity between two different centroid vectors vs, and therefore the similarity between two corresponding suggestions si is their dot product:

$$Sim(s_i, s_j) = v_{si} \cdot v_{sj}$$

1.3 Click-Based Clustering

Clickthrough data maintained by a search engine may be leveraged to segment the set of suggestions S into two or more groups. The clickthrough data may include information about URLs from the search results presented to one or more users that were clicked by the users. For instance, a search log may include three different clicked URLs for a particular query suggestion, "pineapple salsa," over multiple users:

URL1:www.allrecipes.com/pineapple-salsa/detail.aspx
URL2:www.cooks.com/rec/pineapple_salsa.html
URL3:www.blogchefnet/pineapple-salsa-recipe/

Using the clickthrough data for a particular query suggestion si, we can characterize each suggestion si for a portion of a search query (e.g., query prefix) by the set of clicked URLs associated with the suggestion. Suggestions with similar user click behavior may be grouped together in the same group. More particularly, non-identical queries that generate clicks on one or more of the same URLs may capture similar user intent. For instance, the query suggestion "pineapple salsa for fish" may generate clicks on one of the above URLs, indicating that the two suggestions are similar.

Using clicked URLs could result in specific representations which prove to be too restrictive since websites tend to dedicate a web page per concept. Therefore, we can use base URLs from the clickthrough data, rather than the specific clicked URLs. For instance, URL1 can be generalized to www.allrecipes.com. Thus, a URL associated with a web site may be used, rather than a URL associated with a specific web page.

In addition, informational or encyclopedic websites such as www.wikipedia.org may introduce undesired bias and lead to non-similar concepts being placed in the same cluster. Similarly, other websites such as www.youtube.com may also introduce such bias. To address this issue, we can treat each suggestion as a document and compute an inverse document frequency for each base URL and use that as the weight when generating a representation, as will be described in further detail below. Alternatively, we can eliminate one or more URLs based on their inverse document frequency. More particularly, the inverse document frequency may represent the inverse of the frequency with which the suggestion occurs in a query log.

Query suggestions may be represented using clickthrough data. More particularly, given a prefix p and a set of suggestions S associated with it, we can define a clickthrough graph for p. A clickthrough graph may be defined as a bipartite graph including two classes of nodes: suggestion nodes (s nodes) and base URL nodes (u nodes), and a set of directed edges E. Each suggestion in the set of suggestions S may be represented as an s node. To generate the u nodes, we can take the union of the set of base URLs associated with each suggestion and generate a node per distinct base URL. An edge s→u between a suggestion node s and a URL node u indicates that the URL u was clicked when s was issued as a query. Each edge may be assigned a weight, which is the number of times the URL u was clicked when s was issued as a query.

Using the clickthrough graph, for each suggestion s in the graph, we can generate an L2-normalized feature vector of a size equal to the number of URL nodes in the graph, where each dimension in the vector represents a URL in the graph. The value for the dimension associated with a URL j may be computed as:

$$f_j = \frac{w_{sj}}{\sqrt{\sum_i^{|U|} w_s i^2}}$$

if an edge exists between suggestion s and j;
0 otherwise.
where U is the set of URLs in the clickthrough graph and $w_{sj}$ is the weight associated with edge s→j in the clickthrough graph. To compute the similarity between two suggestions for a prefix p, we can use a similarity function such as a cosine-similarity function to generate a similarity metric as follows:

$$Sim(x, y) = \sum_i^{|U|} \frac{x_i y_i}{\sqrt{\sum_i x_i^2} \sqrt{\sum_i y_i^2}}$$

1.4 Clustering Algorithm

Once the similarity between any pair of suggestions in S given a query prefix is defined using one of the three methods discussed above, it can be used as a similarity metric for clustering. A clustering algorithm may then be used to group the suggestions using the corresponding similarity metrics such that similar suggestions are grouped together. More particularly, once the similarity between two different suggestions is estimated, the suggestions may be partitioned into two or more clusters using an unsupervised clustering algorithm such as Hierarchical Agglomerative Clustering.

2. Labeling Clusters

Once a set of suggestions S has been partitioned into two or more groups, a different label or image may be assigned to each group of suggestions and displayed in association with the corresponding group of suggestions. In this manner, a visual cue may be provided to indicate the subject matter of the corresponding group of suggestions. Various methods of assigning a label or image to a group of suggestions are described in detail below.

2.1 Most Frequent Suggestion (MFS)

One way to select a label (or image) for a cluster of query suggestions is to select the most representative suggestion in the cluster. Since every suggestion in the cluster is a query, one way to select the most representative suggestion is to choose the most frequent suggestion that has been presented and/or clicked on by users (e.g., according to a query log). More particularly, a label assigned by MFS to a particular cluster of suggestions S is $$MFS(S)=s_i: s_i \in S, \forall_{S_j \in S} \text{Freq}(s_j) \leq \text{Freq}(s_i)$$

where Freq(x) is the number of times x is observed in a query log.

Once the most representative suggestion in a group of suggestions is identified, a label and/or image associated with the representative suggestion may be obtained and provided (e.g., displayed). For instance, the label may simply be the representative suggestion (e.g., "Nursing"). As another example, an image of a nurse may be provided, rather than the label "nursing."

2.2 Longest Common Subsequence (LCS)

Often, a sequence of characters is shared among suggestions within a cluster, but not with suggestions in other clusters. For example, a portion of a query submitted by a user "us a" may be completed to "us airways" and "us airways flights," (both in one cluster) as well as "us army" and "us army jobs" (in a different cluster). It may be desirable to use the longest common subsequence of the suggestions as a label (or to select an image) for a cluster of query suggestions. The LCS of a set of suggestions S may be denoted as follows $$LCS(S)=l_i: l_i \in Q(S), \forall_{l_j \in Q(S)} \text{Length}(l_j) \leq \text{Length}(l_i)$$

where Q(S) is the set of subsequences of any suggestion s ∈ S. For example, a label that may be assigned by the LCS method to a set of search query suggestions including "nursing home," "nursing home compare," and "nursing home costs" is "nursing home." Thus, once a sequence of characters that is common to a group of two or more suggestions is identified, a label or image associated with (e.g., identifying) the sequence of characters that is common to the group of suggestions may be provided (e.g., displayed).

2.3 Most Frequent in Result Set (MFRS)

One drawback of both the MFS and LCS methods is that they generate a label for a cluster from the suggestions belonging to that cluster. However, for some clusters of suggestions, a meaningful label may not be ascertained solely from the suggestions in the cluster. In these cases, the label for a cluster may be obtained using resources external to the cluster. For example, for a cluster including suggestions "los angeles daily news," "los angeles times," and "los angeles times newspaper," a useful label may be "los angeles newspapers"—a label that has only a partial overlap with all of the suggestions in the cluster.

As with performing the clustering itself, we can use a set of top-ranked documents for each suggestion (when it is used as a query submitted to a search engine) for this external knowledge. More particularly, each search query suggestion may be executed as a search query via a search engine to obtain a corresponding set of documents. By transforming the set of suggestions in a particular cluster into a set of documents, we can apply a variety of methods developed for labeling documents (rather than queries).

One standard approach to labeling clusters of documents is harvesting word n-grams from the documents and selecting the most frequent n-gram. An n-gram is a continuous sequence of n words. Let R(s) be the set of top-ranked search results for a suggestion s; let $R(S)=\cup_{S_i \in S} R(S_i)$; let NG(d) be the set of word n-grams contained in the document d; and let NG(R(S)) be the set of all n-grams in all of the top-ranked documents for the cluster of suggestions, $NG(R(S))=\cup_{d \in R(S)} NG(d)$. Then the label assigned by the MFRS method to the set of suggestions S is $$MFRS(S)=l_i: l_i \in NG(R(S)), \forall_{l_j \in NR(R(S))} \text{Count}(l_j, R(S)) \leq \text{Count}(l_i, R(S)).$$

For example, the MFRS method may assign the label "news" to a cluster of suggestions including the suggestions "los angeles daily news," "los angeles times," and "los angeles times newspaper."

In accordance with one embodiment, for each group of suggestions, a set of search results (e.g., documents) associated with the corresponding set of suggestions may be obtained, where each of the search results includes a corresponding title, abstract and uniform research locator (URL). A label (or image) may then be identified or generated for each group of suggestions using the corresponding set of search results.

2.4 Most Frequent in Modified Result Set (MFRS*)

Search suggestions are unique as a collection of entities to cluster in that they have a high degree of lexical overlap. In a cluster with a long common subsequence, the elements we are interested in labeling are sometimes best represented in those portions of the suggestions that are not shared among all elements of the cluster. Thus, an additional labeling mechanism MRFS* may be applied. MFRS* is similar to MFRS, but the queries that are executed to obtain a set of top ranked documents may be obtained by executing only the portions of the suggestions that are distinct within the cluster (rather than executing the search suggestions in their entirety). For example, for a cluster of suggestions including the suggestions "los angeles public library," "los angeles police department," and "los angeles unified school district," the search queries "public library" and "police department," and "unified school district" may be executed. The MFRS* mechanism may be defined as follows Let $s_i^*$ be the suggestion $s_i$ with the longest common subsequence of the set of suggestions S removed, $s_i^* = s_i - LCS(S)$, and let S* be the set of suggestions in S with the longest common subsequence removed from all suggestions, $S^* = \cup_i s_i^*$, then the label assigned by MFRS* to S is $$MFRS^*(S) = MFRS(S^*).$$

For example, the MFRS* method may assign the label "services" to a cluster of suggestions including the suggestions "los angeles public library," "los angeles police department," and "los angeles unified school district."

2.5 Combined Labeling Strategy

One or more labeling mechanisms such as those described above may be applied separately or in combination with one another to assign a label (or image) to various groups of suggestions. Clusters of suggestions may have different characteristics, and may therefore benefit from different labeling approaches. Therefore, the labeling mechanism(s) that are selected and applied may vary according to the system in which they are applied. Moreover, the labeling mechanism(s) that are selected and applied may vary according to cluster characteristics of the cluster.

A label (or image) may be assigned to a cluster solely using information (e.g., suggestions) from within the cluster. For instance, a mechanism such as MFS or LCS may be applied to assign a label (or image). Alternatively, a label (or image) may be assigned to a cluster using information (e.g., search results) external to the cluster in addition to or instead of information from within the cluster. For example, a mechanism such as MFRS or MFRS* may be applied to assign a label (or image).

In one embodiment, a cluster may be examined to determine a degree of cluster cohesion of the cluster. In other words, the cluster may be examined to determine the degree to which the elements of the cluster (e.g., suggestions) are similar. The more compact the cluster is (e.g., the more similar the elements of the cluster are), the more likely it is that an appropriate label may be found in the members of the cluster rather than externally. The degree of cohesion of a set of suggestions S may be measured using the average distance between the elements of the cluster S. Where the degree of cohesion of the cluster S is less than a threshold amount, a mechanism using information external to the cluster such as MFRS or MFRS* may be applied; in other instances, a mechanism using information within the cluster such as MFS or LCS may be applied.

3. Ordering Suggestion Clusters

The disclosed embodiments may be applied to present a set of suggestions for completing a query to reduce the user's effort in locating a desired suggestion among the set of suggestions. The manner in which the set of suggestions are grouped may reduce the amount of user effort. Similarly, the order in which the groups of suggestions are presented, as well as the order in which suggestions within a particular group of suggestions are presented, may also impact the amount of user effort that is expended to locate a desired suggestion among the set of suggestions that are presented.

In accordance with one aspect, an order in which the two or more groups of suggestions are to be provided may be ascertained prior to providing the two or more groups of suggestions for display. The two or more groups of suggestions may then be provided such that the two or more groups of suggestions are displayed in separate partitions of a search assistance segment of the user interface according to the ascertained order.

A cost metric may be applied to characterize the user effort spent in locating a suggestion from among a set of clusters of suggestions. More particularly, the cost metric may generate a numerical value representing an expected cost of locating a suggestion from among the two or more groups of suggestions. An algorithm may then be applied to minimize the expected cost of locating a suggestion among the set of clusters of suggestions.

By clustering (and labeling) a set of suggestions to be presented in association with a portion of a search query that has been entered by a user, we can enable the user to skip between clusters and then upon identifying a relevant cluster, the user may scan within the cluster to locate a desired suggestion. Thus, the cost of identifying a desired suggestion may be defined as:

Time to read a cluster label: A user may browse the clusters of suggestions by reading the corresponding labels (or images). At each cluster C, the user may decide if the cluster should be skipped or scanned, depending upon whether the label captures the user's area of interest. We may denote the cost in reading the label of a cluster as $T_{lb}(C)$.

Time to scan a cluster: Once a cluster C that contains the desired suggestion s has been identified, the user may scan the suggestions in the cluster C until the desired suggestion s is located. We may denote the cost of scanning each suggestion s in the cluster by $T_{sc}(s)$.

Consider a user who has entered a query prefix p and is interested in locating a suggestion s from a set of clusters C1, C2 . . . , Cn, and let Cm be the cluster that contains the suggestions s1, s2, . . . sj such that sk=s. In other words, the suggestion s is located at position k within the cluster Cm. The cost of locating suggestion s for the user, which may denote T(s), may be defined as $\Sigma_{i=1}^{m} T_{lb}(Ci) + \Sigma_{j=1}^{k} T_{sc}(s_j)$. For simplicity, we may assume that the cost to read any cluster label is the same for all clusters, namely $T_{lb}$. Similarly, we may assume that the cost to scan through suggestions within a cluster id Tsc, the same regardless of the suggestion. T(s) for a suggestion s at position k in cluster m then becomes $T(s) = m \cdot Tlb + k \cdot Tsc$.

For a user who has entered prefix p, the expected cost T(p) of locating the suggestion of interest among the suggestions may be defined as $$Tp(R) = \sum_{\forall s} T(s) \cdot P(s \mid p),$$

where P(s|p) denotes the probability that the user prefers suggestion s when the prefix has been entered and Tp is a function of the ranking R of the suggestion s. P(s|p) may be estimated from the query logs based upon observed user preferences when entering the prefix p. More particularly, the queries including the prefix p that have been submitted or selected by the user (or users in general) may be identified. The number of times that the query s has been submitted or selected vs the total number of queries that include the prefix s may then be ascertained from the identified queries. Specifically, if f(p) is the number of times that the prefix was entered by a user (or users) (e.g., the number of times that a query including the prefix was submitted by a user or users), and f(s) is the number of times that the suggestion s was submitted as a user query, then $$P(s \mid p) = \frac{f(s)}{f(p)}$$

Note that $$\sum_{\forall s} P(s \mid p)$$

will generally be less than 1, since users may have entered queries that are not among the set of suggestions. We may assume that the cost to the user interested in a suggestion not present in the set of suggestions to be independent of the ranking of the set of suggestions that are presented.

A ranking algorithm may be used to order the clusters, as well as the suggestions within the clusters, to minimize Tp(R). In one embodiment, the ranking algorithm may rank suggestions within a cluster in nonincreasing order (e.g., decreasing order) of frequencies f(s). To rank clusters of suggestions, each cluster S may be assigned an aggregate frequency F(C) equal to the sum of the frequencies of all of the suggestions in the cluster C. Thus, a ranking algorithm may rank the clusters of suggestions in nonincreasing order (e.g., decreasing order) of aggregate frequencies F(C).

In accordance with another aspect, the suggestions with each of the groups of suggestions may be ordered. More particularly, an order in which the subset of the set of suggestions within each of the two or more groups of suggestions is to be provided may be ascertained. For instance, the order may indicate a popularity of the suggestions according to a query log. The suggestions of each of the two or more groups of suggestions may then be displayed in a corresponding partition of the search assistance segment of the user interface according to the ascertained order.

Figure 5:
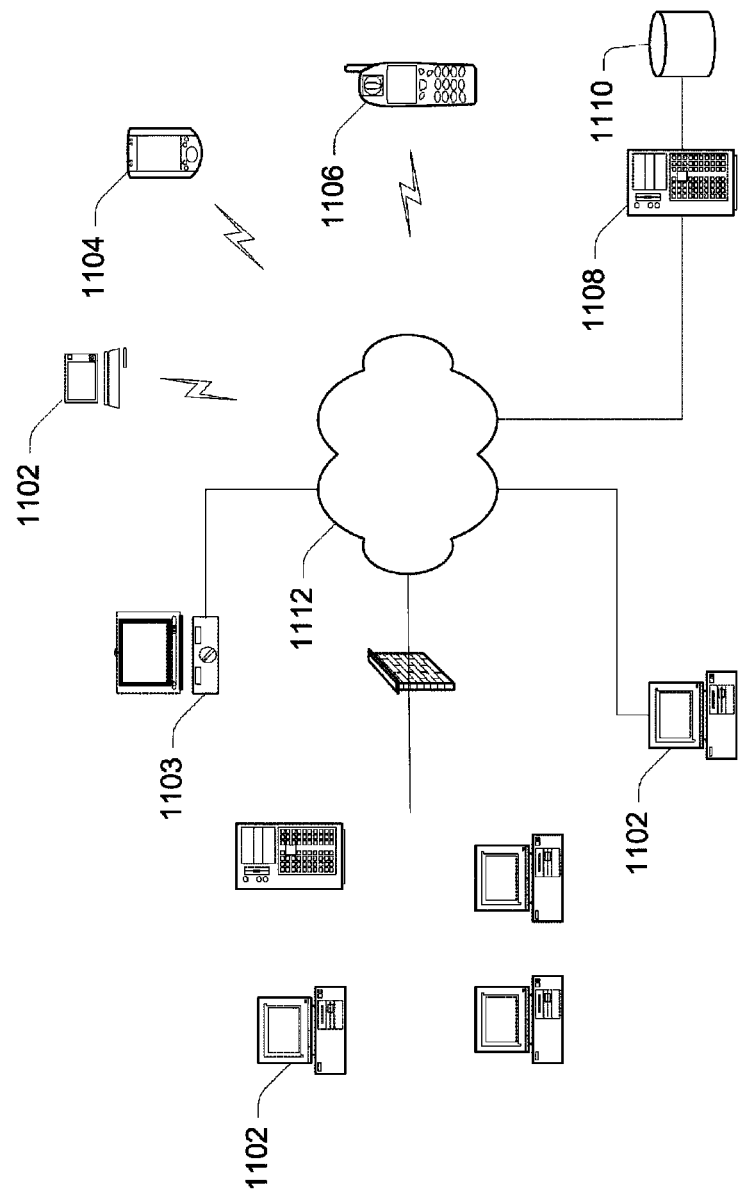
FIG. 5 is a simplified diagram of an example network environment in which various embodiments may be implemented.

Embodiments of the present invention may be employed to perform a search via a graphical user interface while providing search suggestions using the same graphical user interface. The disclosed embodiments may be implemented in any of a wide variety of computing contexts. For example, as illustrated in FIG. 5, implementations are contemplated in which users interact with a diverse network environment via any type of computer (e.g., desktop, laptop, tablet, etc.) 1102, media computing platforms 1103 (e.g., cable and satellite set top boxes and digital video recorders), handheld computing devices (e.g., PDAs) 1104, cell phones 1106, or any other type of computing or communication platform.

And according to various embodiments, input that is processed in accordance with the invention may be obtained using a wide variety of techniques. For example, a search query may be obtained via a graphical user interface from a user's interaction with a local application, web site or web-based application or service and may be accomplished using any of a variety of well known mechanisms for obtaining information from a user. However, it should be understood that such methods of obtaining input from a user are merely examples and that a search query may be obtained in many other ways.

Search suggestions may be clustered and presented according to the disclosed embodiments in some centralized manner. This is represented in FIG. 5 by server 1108 and data store 1110 which, as will be understood, may correspond to multiple distributed devices and data stores. The invention may also be practiced in a wide variety of network environments (represented by network 1112) including, for example, TCP/IP-based networks, telecommunications networks, wireless networks, etc. In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

The disclosed techniques of the present invention may be implemented in any suitable combination of software and/or hardware system, such as a web-based server or desktop computer system. Moreover, a system implementing various embodiments of the invention may be a portable device, such as a laptop or cell phone. The search apparatus and/or web browser of this invention may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the required method steps.

Regardless of the system's configuration, it may employ one or more memories or memory modules configured to store data, program instructions for the general-purpose processing operations and/or the inventive techniques described herein. The program instructions may control the operation of an operating system and/or one or more applications, for example. The memory or memories may also be configured to store instructions for performing the disclosed methods, as well as query logs, labels, images, search results, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Figure 6:
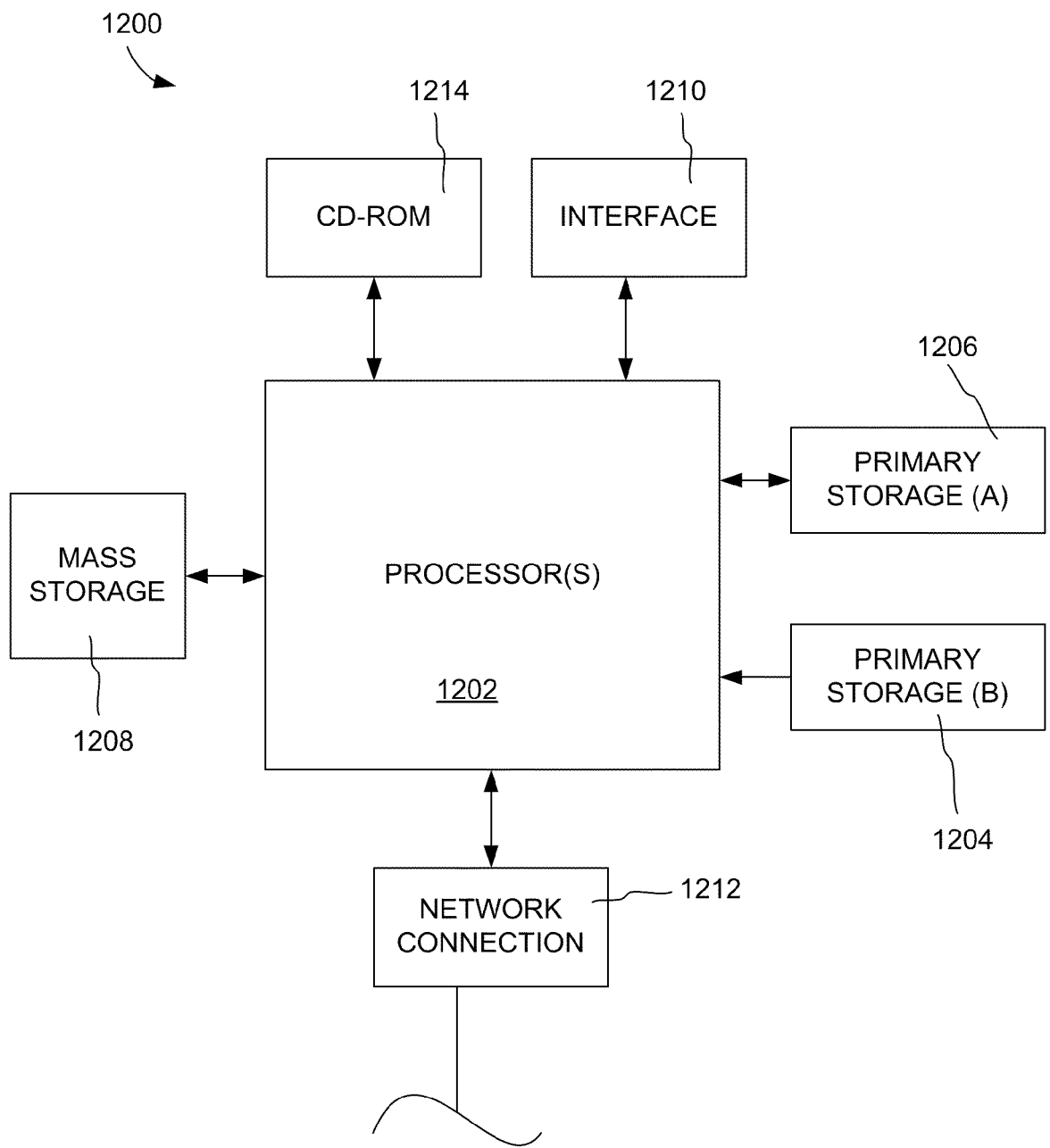
FIG. 6 illustrates an example computer system in which various embodiments may be implemented.

FIG. 6 illustrates a typical computer system that, when appropriately configured or designed, can serve as a system of this invention. The computer system 1200 includes any number of processors 1202 (also referred to as central processing units, or CPUs) that are coupled to storage devices including primary storage 1206 (typically a random access memory, or RAM), primary storage 1204 (typically a read only memory, or ROM). CPU 1202 may be of various types including microcontrollers and microprocessors such as programmable devices (e.g., CPLDs and FPGAs) and unprogrammable devices such as gate array ASICs or general purpose microprocessors. As is well known in the art, primary storage 1204 acts to transfer data and instructions uni-directionally to the CPU and primary storage 1206 is used typically to transfer data and instructions in a bi-directional manner. Both of these primary storage devices may include any suitable computer-readable media such as those described above. A mass storage device 1208 is also coupled bi-directionally to CPU 1202 and provides additional data storage capacity and may include any of the computer-readable media described above. Mass storage device 1208 may be used to store programs, data and the like and is typically a secondary storage medium such as a hard disk. It will be appreciated that the information retained within the mass storage device 1208, may, in appropriate cases, be incorporated in standard fashion as part of primary storage 1206 as virtual memory. A specific mass storage device such as a CD-ROM 1214 may also pass data uni-directionally to the CPU.

CPU 1202 may also be coupled to an interface 1210 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1202 optionally may be coupled to an external device such as a database or a computer or telecommunications network using an external connection as shown generally at 1212. With such a connection, it is contemplated that the CPU might receive information from the network, or might output information to the network in the course of performing the method steps described herein.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method, comprising:
obtaining a segment of text via a search query section of a user interface in response to input of the segment of text via the search query section of the user interface, the segment of text being a portion of a search query that has not been submitted by a user;
obtaining a set of suggestions, each suggestion in the set of suggestions being a suggested completion of the search query such that the suggestion includes the segment of text;
generating two or more groups of suggestions, each of the two or more groups of suggestions including a different subset of the set of suggestions, wherein each of the two or more groups of suggestions corresponds to a different interpretation of the portion of the search query that has not been submitted by a user;
providing the two or more groups of suggestions such that each of the two or more groups of suggestions is displayed in a separate section of a search assistance segment of the user interface;
providing a label or image in association with each of the two or more groups of suggestions such that the label or image is displayed in the user interface in close proximity to the corresponding one of the two or more groups of suggestions; and
for each one of the two or more groups of suggestions, identifying a sequence of characters that is at least a portion of each suggestion in the corresponding subset of the set of suggestions;
wherein providing the label or image in association with each of the two or more groups of suggestions includes providing a label or image associated with the sequence of characters that is at least a portion of each suggestion in the corresponding subset of suggestions.

2. The method of claim 1, wherein
the label or image is provided such that the label or image is displayed in association with the corresponding partition of the search assistance segment of the user interface.

3. The method of claim 1, wherein generating two or more groups of suggestions comprises:
obtaining a set of one or more features associated with each suggestion in the set of suggestions; and
applying the set of one or more features associated with each suggestion in the set of suggestions to generate the two or more groups of suggestions.

4. The method of claim 3, further comprising:
parsing each suggestion in the set of suggestions to obtain a set of one or more words for the corresponding suggestion;
wherein the set of one or more features associated with each suggestion in the set of suggestions includes a representative word in the corresponding set of one or more words.

5. The method of claim 3, further comprising:
obtaining a set of search results associated with each suggestion in the set of suggestions, each search result of the set of search results include a corresponding title, abstract and uniform research locator (URL);
wherein the set of one or more features associated with each suggestion in the set of suggestions includes or is based upon a set of words in the corresponding set of search results.

6. The method of claim 5, wherein the set of words in the corresponding set of search results includes at least one of words in the title of at least a portion of the set of search results, words in the abstract of at least a portion of the set of search results, or words in the URL of at least a portion of the set of search results.

7. The method of claim 3, further comprising:
obtaining search results associated with each suggestion in the set of suggestions, each of the search results including a uniform research locator (URL);
obtaining clickthrough data associated with each suggestion in the set of suggestions;
wherein the set of one or more features associated with each suggestion in the set of suggestions includes the obtained clickthrough data associated with the corresponding suggestion, wherein the clickthrough data pertains to the URLs of the search results associated with the corresponding suggestion.

8. The method of claim 1, further comprising:
determining whether to present the two or more groups of suggestions;
wherein providing the two or more groups of suggestions is performed according to whether it is determined that the two or more groups of suggestions are to be presented.

9. The method of claim 1, further comprising:
ascertaining an order in which the subset of the set of suggestions within each of the two or more groups of suggestions is to be provided;
wherein providing the two or more groups of suggestions is performed such that the subset of the set of suggestions of each of the two or more groups of suggestions are displayed in a corresponding partition of the search assistance segment of the user interface according to the ascertained order.

10. The method of claim 1, further comprising:
ascertaining an order in which the two or more groups of suggestions are to be provided prior to providing the two or more groups of suggestions;
wherein providing the two or more groups of suggestions is performed such that the two or more groups of suggestions are displayed in separate partitions of the search assistance segment of the user interface according to the ascertained order.

11. The method of claim 10, wherein ascertaining an order in which the two or more groups of suggestions are to be provided comprises:
applying a cost metric to generate a numerical value representing an expected cost of locating a suggestion from among the two or more groups of suggestions; and
minimizing the expected cost of locating a suggestion from among the two or more groups of suggestions.

12. The method as recited in claim 1, wherein the portion of the search query is a sequence of characters typed by a user while formulating the search query.

13. The method as recited in claim 12, wherein the portion of the search query is a prefix, infix, or suffix.

14. The method as recited in claim 1, further comprising:
receiving a selection of a suggestion in one of the two or more groups of suggestions; and
executing the selected suggestion as a search query via one or more search applications.

15. A non-transitory computer-readable medium storing thereon computer-readable instructions, comprising:
instructions for obtaining a segment of text via a search query section of a user interface in response to input of the segment of text via the search query section of the user interface, the segment of text being a portion of a search query that has not been submitted by a user;
instructions for obtaining a set of suggestions, each suggestion in the set of suggestions being a suggested completion of the search query such that the suggestion includes the segment of text;
instructions for determining from the set of suggestions that the search query that has not been submitted by the user is an ambiguous query;
instructions for generating two or more groups of suggestions, each of the two or more groups of suggestions including a different subset of the set of suggestions, wherein each of the two or more groups of suggestions corresponds to a different interpretation of the portion of the search query that has not been submitted by a user;
instructions for providing the two or more groups of suggestions such that each of the two or more groups of suggestions is displayed in a separate partition of a search assistance segment of the user interface;
instructions for providing a label or image in association with each of the two or more groups of suggestions such that the label or image is displayed in the user interface in close proximity to the corresponding one of the two or more groups of suggestions; and
instructions for identifying, for each one of the two or more groups of suggestions, a sequence of characters that is at least a portion of each suggestion in the corresponding subset of the set of suggestions;
wherein providing the label or image in association with each of the two or more groups of suggestions includes providing a label or image associated with the sequence of characters that is at least a portion of each suggestion in the corresponding subset of suggestions.

16. The non-transitory computer-readable medium of claim 15,
wherein the label or image is provided such that the label or image is displayed in association with the corresponding partition of the search assistance segment of the user interface.

17. The non-transitory computer-readable medium of claim 15, further comprising:
instructions for generating a first set of two or more groups of suggestions, each of the first set of two or more groups of suggestions including a different subset of the set of suggestions;
wherein determining from the set of suggestions that the search query is an ambiguous query is performed based upon a number of suggestions in each of the first set of two or more groups of suggestions.

18. The non-transitory computer-readable medium as recited in claim 15, wherein determining from the set of suggestions that the search query that has not been submitted by the user is an ambiguous query comprises determining that there is more than one possible interpretation of the portion of the search query that has not been submitted by the user.

19. An apparatus, comprising:
a processor; and
a memory, at least one of the processor and the memory being configured for:
obtaining a segment of text via a search query box of a user interface in response to input of the segment of text via the search query box of the user interface, the segment of text being a portion of a search query that has not been submitted by a user;
obtaining a set of suggestions, each suggestion in the set of suggestions being a suggested completion of the search query such that the suggestion includes the segment of text;
determining from the set of suggestions that the search query that has not been submitted by the user is an ambiguous query;
generating two or more groups of suggestions, each of the two or more groups of suggestions including a different subset of the set of suggestions, wherein each of the two or more groups of suggestions corresponds to a different interpretation of the portion of the search query that has not been submitted by a user;
providing the two or more groups of suggestions such that each of the two or more groups of suggestions is displayed in a separate segment of a search assistance segment of the user interface;
providing a label or image in association with each of the two or more groups of suggestions such that the label or image is displayed in the user interface in close proximity to the corresponding one of the two or more groups of suggestions; and for each one of the two or more groups of suggestions, identifying a sequence of characters that is at least a portion of each suggestion in the corresponding subset of the set of suggestions;

wherein providing the label or image in association with each of the two or more groups of suggestions includes providing a label or image associated with the sequence of characters that is at least a portion of each suggestion in the corresponding subset of suggestions.

20. The apparatus of claim 19, wherein the label or image associated with each of the two or more groups of suggestions is provided in the corresponding segment of the search assistance segment of the user interface.

21. The apparatus of claim 19, at least one of the processor or the memory being configured for performing steps, further comprising:

identifying a representative suggestion from the subset of suggestions for each one of the two or more groups of suggestions; and obtaining a representative label or image associated with the representative suggestion in the corresponding one of the two or more groups of suggestions;

wherein providing the label or image in association with each of the two or more groups of suggestions includes providing the representative label or image associated with the representative suggestion in the corresponding one of the two or more groups of suggestions.

22. The apparatus of claim 21, wherein the representative suggestion is a most frequently occurring one of the subset of suggestions according to a query log.

23. The apparatus of claim 19, at least one of the processor or the memory being configured for performing steps, further comprising:

for each of the two or more groups of suggestions, obtaining a set of search results associated with the corresponding subset of the set of suggestions, each search result of the set of search results include a corresponding title, abstract and uniform research locator (URL); and identifying or generating a label for each of the two or more groups of suggestions using the corresponding set of search results.

24. The apparatus of claim 23, wherein obtaining the set of search results is performed by executing a search query for one or more suggestions in the corresponding subset of the set of suggestions.

25. The apparatus of claim 23, wherein obtaining the set of search results is performed by executing a search query using only portions of suggestions in the corresponding subset of the set of suggestions that are distinct within the corresponding one of the two or more groups of suggestions.

26. The apparatus of claim 19, at least one of the processor or the memory being configured for performing steps, further comprising:

for each one of the two or more groups of suggestions:

identifying a topic or aspect that is shared by the subset of the set of suggestions in the one of the two or more groups of suggestions, wherein the topic or aspect is not shared by other subsets of suggestions in the set of suggestions; and obtaining a label or image representing the topic or aspect, thereby enabling the label or image to be provided in association with the corresponding one of the two or more groups of suggestions.

27. The apparatus of claim 19, at least one of the processor or the memory being configured for performing steps, further comprising:

for each one of the two or more groups of suggestions:

ascertaining a degree of cohesion of the one of the two or more groups of suggestions; and obtaining a label or image associated with the one of the two or more groups of suggestions using information external to the one of the two or more groups of suggestions according to the degree of cohesion of the one of the two or more groups of suggestions.

\* \* \* \* \*